(12) United States Patent
Wolfenbarger et al.

(10) Patent No.: US 11,078,629 B1
(45) Date of Patent: Aug. 3, 2021

(54) THICK-CALIPER LAMINATED PAPERBOARD AND METHODS FOR MAKING THE SAME

(71) Applicant: Caraustar Industrial and Consumer Products Group, Inc., Austell, GA (US)

(72) Inventors: Josh Wolfenbarger, Ida, MI (US); Don Ervin, South Jacksonville, IL (US)

(73) Assignee: Caraustar Industrial and Consumer Products Group, Inc., Austell, GA (US)

( * ) Notice: Subject to any disclaimer, the term of this patent is extended or adjusted under 35 U.S.C. 154(b) by 40 days.

(21) Appl. No.: 16/265,278

(22) Filed: Feb. 1, 2019

Related U.S. Application Data

(60) Provisional application No. 62/799,322, filed on Jan. 31, 2019, provisional application No. 62/624,972, filed on Feb. 1, 2018.

(51) Int. Cl.
| | |
|---|---|
| *D21H 27/34* | (2006.01) |
| *D21H 25/04* | (2006.01) |
| *B32B 29/00* | (2006.01) |
| *D21F 11/04* | (2006.01) |
| *D21F 11/08* | (2006.01) |
| *D21H 27/38* | (2006.01) |
| *B32B 5/26* | (2006.01) |

(52) U.S. Cl.
CPC ............ *D21H 27/34* (2013.01); *D21H 27/38* (2013.01); *B32B 5/26* (2013.01); *B32B 29/005* (2013.01); *B32B 2250/26* (2013.01); *B32B 2262/067* (2013.01); *B32B 2309/105* (2013.01); *B32B 2317/12* (2013.01); *B32B 2439/62* (2013.01); *D21F 11/04* (2013.01); *D21F 11/08* (2013.01); *D21H 25/04* (2013.01)

(58) Field of Classification Search
CPC ........ D21H 27/34; D21H 27/38; D21H 25/04; B32B 1/08; B32B 15/12; B32B 27/10; B32B 5/26; B32B 29/005; B32B 2262/067; B32B 2309/105; B32B 2250/26; B32B 2317/12; B32B 2439/62; D21F 11/04; D21F 11/08; Y10T 156/1038; Y10T 428/1303; Y10T 428/1393; B31B 2105/0022
See application file for complete search history.

(56) References Cited

U.S. PATENT DOCUMENTS

| | | | | | |
|---|---|---|---|---|---|
| 2,259,577 | A | * | 10/1941 | Morgan | .................. B31C 1/00 493/279 |
| 3,194,469 | A | * | 7/1965 | Rumberger | ............ D21H 19/18 229/122.32 |
| 3,252,387 | A | * | 5/1966 | Schur | ........................ B31C 1/00 493/306 |
| 3,657,042 | A | * | 4/1972 | Rerolle | .................. B29C 66/45 156/190 |

(Continued)

*Primary Examiner* — Jose A Fortuna
(74) *Attorney, Agent, or Firm* — Additon, Pendleton & Witherspoon, P.A.

(57) ABSTRACT

Methods of making laminated paper sheets include winding paper around a flat-sided mandrel to form a flat-sided convolute tube and cutting from the flat-sided convolute tube one or more laminated paper sheets. The laminated paper sheets are alternatives to plastic, wood, and wood-like materials, such as plywood, medium-density fiberboard (MDF), and oriented strand board (OSB).

20 Claims, 13 Drawing Sheets

(56) References Cited

U.S. PATENT DOCUMENTS

| | | | | |
|---|---|---|---|---|
| 3,701,710 | A * | 10/1972 | Germain | D06M 17/00 |
| | | | | 428/201 |
| 3,869,325 | A * | 3/1975 | Witzig | B31C 1/00 |
| | | | | 156/192 |
| 5,169,496 | A * | 12/1992 | Wagle | D21C 9/185 |
| | | | | 162/125 |
| 5,273,605 | A * | 12/1993 | Mitchell | B31C 1/00 |
| | | | | 156/183 |
| 6,669,814 | B2 * | 12/2003 | Hansen | B32B 29/00 |
| | | | | 162/129 |
| 6,833,055 | B2 * | 12/2004 | Hansen | B32B 29/00 |
| | | | | 162/125 |
| 6,835,256 | B2 * | 12/2004 | Menzies | A44B 18/0003 |
| | | | | 156/62.4 |
| 8,801,526 | B1 | 8/2014 | Conger et al. | |
| 9,599,147 | B1 | 3/2017 | Conger et al. | |
| 2003/0168191 | A1 * | 9/2003 | Hansen | D21H 27/38 |
| | | | | 162/129 |
| 2004/0052987 | A1 * | 3/2004 | Shetty | B65D 3/22 |
| | | | | 428/34.2 |
| 2004/0069428 | A1 * | 4/2004 | Hansen | D21F 9/02 |
| | | | | 162/123 |
| 2008/0182098 | A1 * | 7/2008 | Nakanishi | B32B 37/0053 |
| | | | | 428/326 |
| 2009/0098324 | A1 * | 4/2009 | Hasegawa | B29C 70/446 |
| | | | | 428/36.4 |
| 2017/0130402 | A1 * | 5/2017 | Tsutsumi | D21H 23/56 |
| 2017/0328005 | A1 * | 11/2017 | Parker | D21H 19/82 |
| 2019/0263082 | A1 * | 8/2019 | Spanjers | B31C 1/00 |
| 2020/0109517 | A1 * | 4/2020 | Pang | D21H 19/38 |
| 2020/0332468 | A1 * | 10/2020 | Sippus | D21F 9/00 |

* cited by examiner

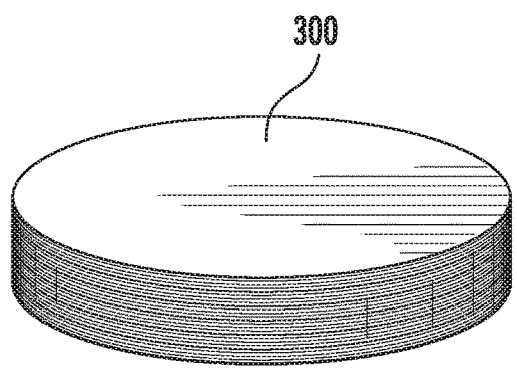
FIG. 12A
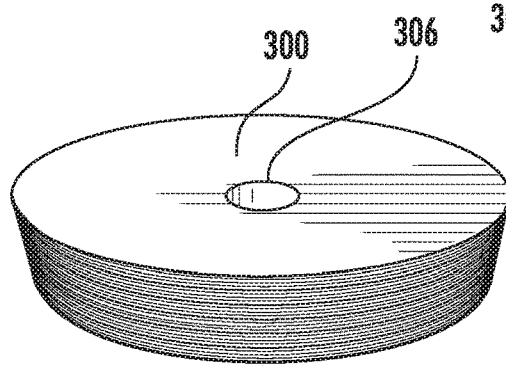
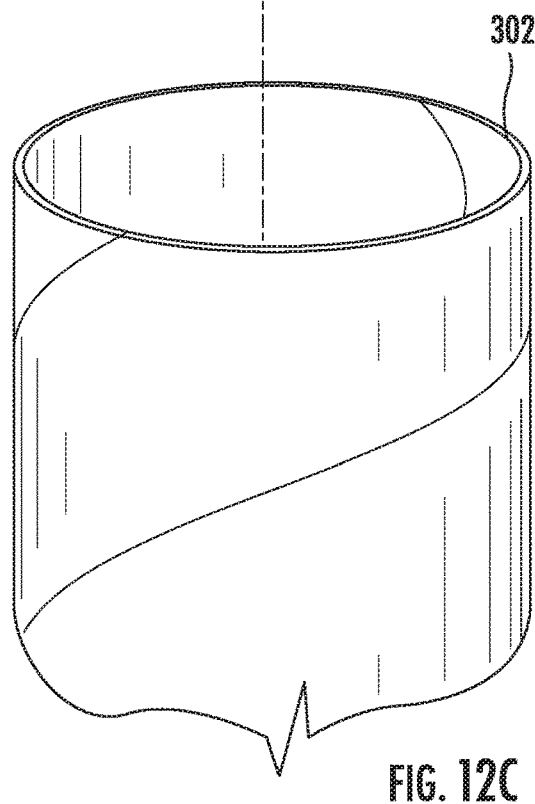
FIG. 12C
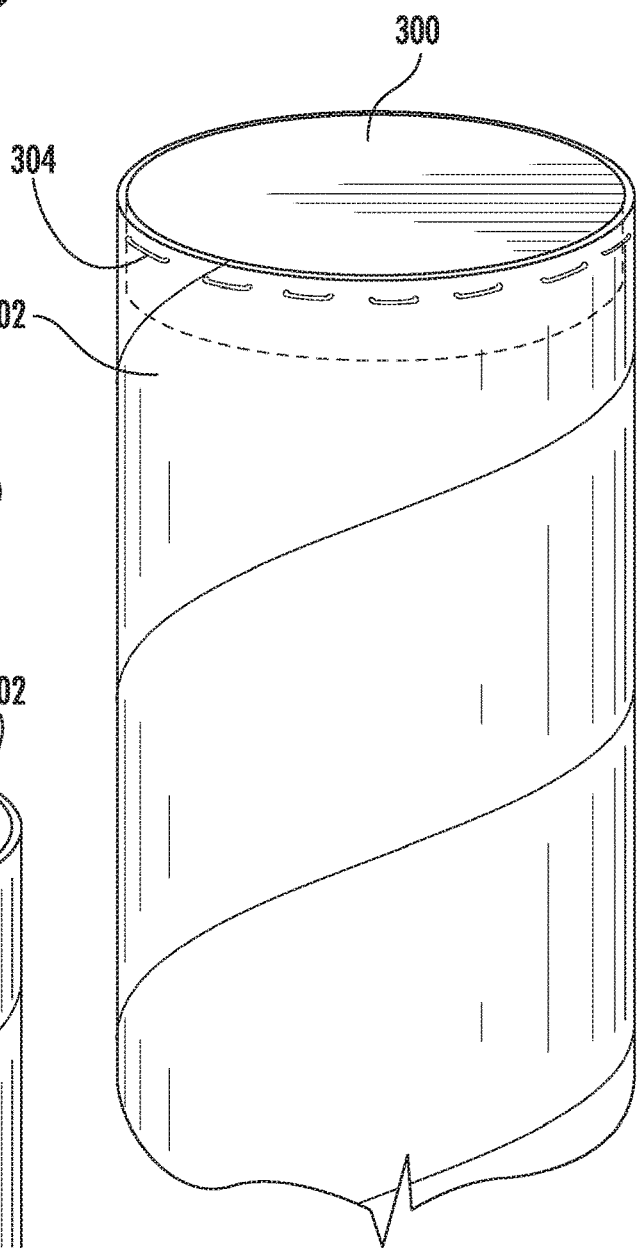
FIG. 12B

THICK-CALIPER LAMINATED PAPERBOARD AND METHODS FOR MAKING THE SAME

CROSS-REFERENCE TO PRIORITY APPLICATIONS

This application hereby claims the benefit of U.S. Patent Application No. 62/624,972 for Methods of Making Laminated Paperboard (filed Feb. 1, 2018) and U.S. Patent Application No. 62/799,322 for Methods of Making Laminated Paperboard (filed Jan. 31, 2019), each of which is hereby incorporated by reference in its entirety.

FIELD OF THE INVENTION

The present invention relates to laminated paper and paperboard alternatives to wood and wood-like materials.

BACKGROUND

Packaging and structural materials are often neither renewable nor recyclable. Wood, plywood, medium-density fiberboard (MDF), and oriented strand board (OSB) are typically non-recyclable wastes after becoming exhausted as product components (e.g., rope reels, cable reels, and wire reels).

For example, conventional rope, cable, and wire reels might include two plywood, plastic, or MDF sides (e.g., circular ends) affixed to a paper tube (i.e., the planar plywood ends are substantially perpendicular to the paper tube's central axis). The materials (e.g., wood and plastic) that form the rope, cable, and wire reels are not easily recycled and so the reels are typically discarded (e.g., landfilled) at the end of their useful life. Even if a user were to disassemble or otherwise remove the plywood sides to facilitate recycling of the paper tube and metal fasteners (e.g., hardware, such as nuts and bolts), the plywood sides would nevertheless be discarded as waste.

SUMMARY

Therefore, there is a need for packaging and structural materials that are renewable and recyclable. For example, compactable, rope, cable, and wire reels made entirely from paper (e.g., paperboard) would be completely and fully recyclable.

In one aspect, the invention embraces laminated paperboard materials that are alternatives to wood and wood-like materials, such as plywood, medium-density fiberboard (MDF), and oriented strand board (OSB).

In another aspect, the invention embraces methods of making laminated paperboard materials.

In yet another aspect, the invention embraces products (e.g., structures) that are formed from laminated paperboard materials. In exemplary embodiments, the products formed from laminated paperboard materials are fully recyclable in a single recycle stream.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

The drawings are provided as examples, may be schematic, and may not be drawn to scale. The present inventive aspects may be embodied in many different forms and should not be construed as limited to the examples depicted in the drawings.

FIG. 12A is an isolated view of a core closure or core plug configured for closing the end of a tube, wherein the closure or plug is at least partially formed from laminated paper or paperboard sheet, in accordance with an embodiment of this disclosure.

FIG. 12B depicts the core plug of FIG. 12A mounted in the end of a tube, in accordance with an embodiment of this disclosure.

FIG. 12C is an exploded view of a core closure or core plug and a tube, wherein the closure or plug is at least partially formed from laminated paper or paperboard sheet, in accordance with another embodiment of this disclosure.

DETAILED DESCRIPTION

In this detailed description, various aspects and features are herein described with reference to the accompanying figures. These aspects and features generally pertain to methods of making laminated paperboard, and to exemplary applications of laminated paperboard.

Specific details are set forth to provide a thorough understanding of the present disclosure. It will be apparent, however, to those having ordinary skill in the art that the disclosed laminated paperboard and associated methods may be practiced without some or all of these specific details. As another example, features disclosed as part of one embodiment can be used in the context of another embodiment to yield a further embodiment. In some instances, well-known aspects have not been described in detail to avoid unnecessarily obscuring the present disclosure. This detailed description is therefore not to be taken in a limiting sense, and it is intended that other embodiments are within the spirit and scope of the present disclosure.

Figure 2:
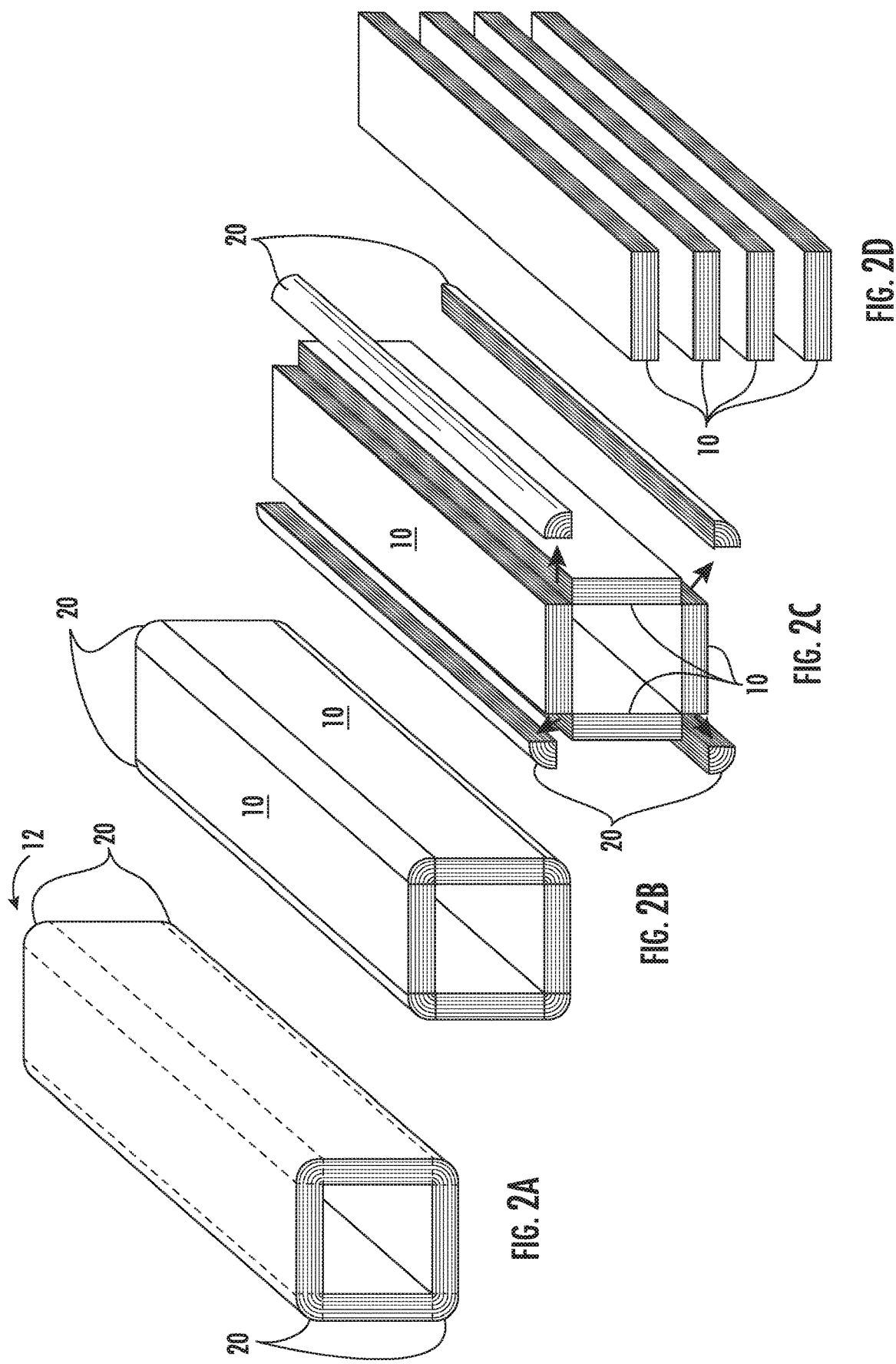
FIG. 2A is an isolated view of a convolute paper tube manufactured using the system and method of FIG. 1.
FIG. 2B depicts lengthwise cuts along the edges of the convolute paper tube of FIG. 2A.
FIG. 2C depicts removal of the edges of the convolute paper tube of FIG. 2B.
FIG. 2D depicts, in isolation and rearranged, resultant laminated paper or paperboard sheets of the convolute paper tube of FIG. 2C.

Laminated paper materials (e.g., laminated paperboard sheets or boards) according to the present invention can be manufactured in different ways. Examples of thick-caliper laminated paper material (e.g., elongated sheets or strips of laminated paperboard) are depicted in FIG. 2D and designated by the numeral 10.

Figure 1:
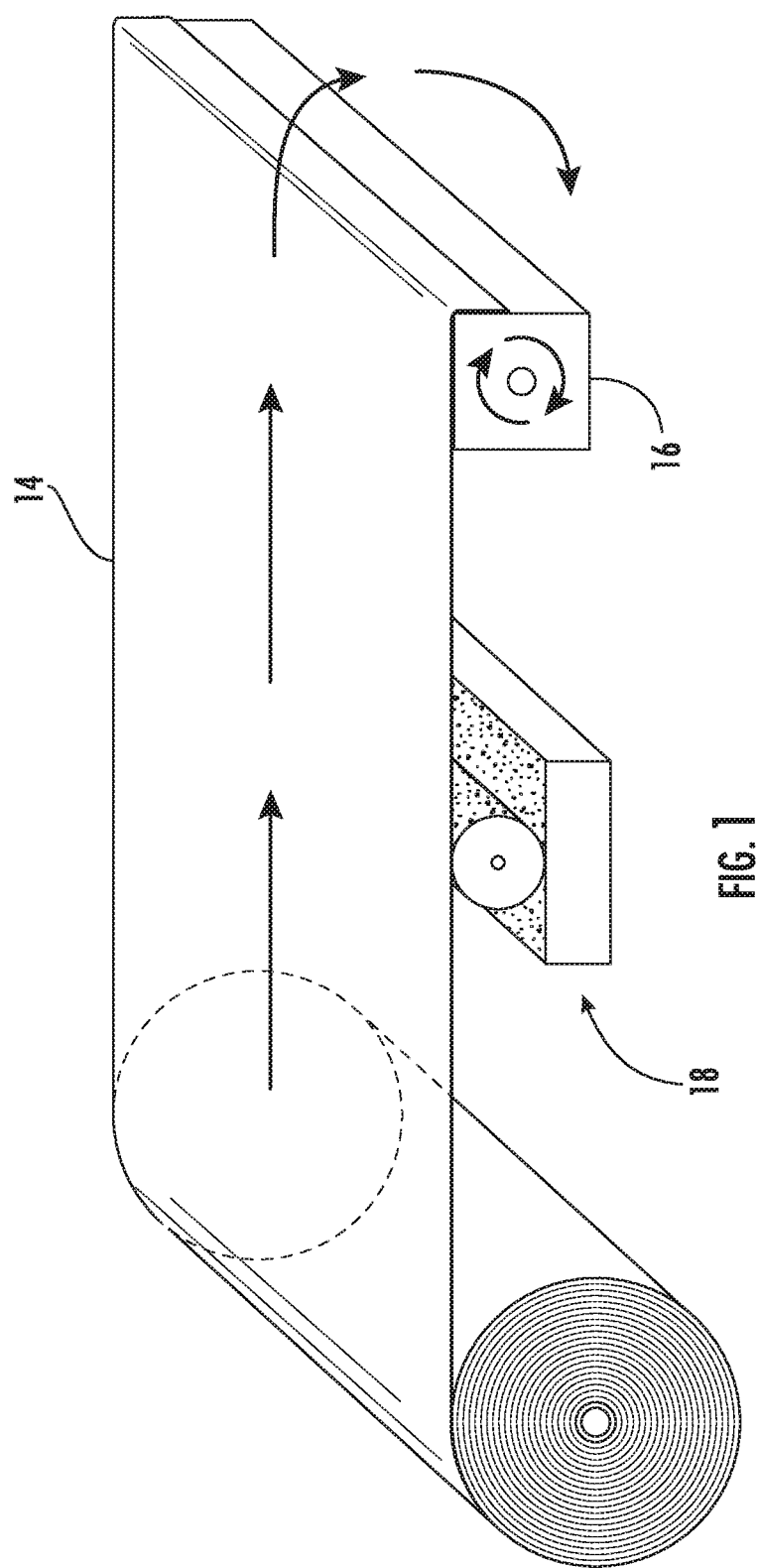
FIG. 1 depicts a system and method for forming a convolute paper tube, in accordance with an embodiment of this disclosure.

In one exemplary process embodiment, a portion of which is depicted in FIG. 1, laminated paper or paperboard sheets 10 (e.g., boards) are manufactured by forming a convolute tube 12 (FIG. 2A) having a plurality of flat sides (e.g., a substantially polygonal shape), such as a rectangle with rounded corners. As depicted in FIG. 1, paper 14 (e.g., a single continuous paper web) is unwound from a paper roll (e.g., a jumbo roll of paper) to a mandrel 16 having a plurality of planar surfaces (e.g., flat sides) configured for winding paper (e.g., a polygonal mandrel, such as a substantially square mandrel as depicted in FIG. 1). Typically, the mandrel 16 is rotated about a rotational axis so as to continuously pull paper 14 from the feed roll (e.g., rewinding the paper web). In the exemplary embodiment depicted in FIG. 1, the plurality of mandrel flat sides (e.g., the sides around which the paper 14 is rewound) collectively extend around the rotational axis of the mandrel 16, and each of the mandrel's flat sides extends along the length of (e.g., parallel to) the mandrel's rotational axis.

As the paper 14 travels from the initial paper roll (i.e., the feed roll) to the mandrel 16, adhesive (e.g., an adhesive film) is applied to the paper's surface (e.g., the paper's inner surface as depicted in FIG. 1) by way of an adhesive applicator 18. Any suitable adhesive applicator 18 may be used (e.g., an adhesive applicator, sprayer, or bath, such as employing rollers and/or doctor blades). In the example depicted in FIG. 1, the adhesive is schematically depicted by stippling, and the adhesive applicator 18 includes an upwardly open trough for containing a bath of the adhesive, and an application roller engaged against the underside of the paper 14 and partially immersed in the adhesive bath. The adhesive bonds adjacent layers of paper (i.e., paper plies) as the paper 14 is rewound on the mandrel 16. In this way, a convolute paperboard tube 12 (e.g., a tubular laminated-paper substrate) is formed as depicted in FIG. 2A. Because the exemplary mandrel is a polygon (e.g., a rectangle, such as a square), the resulting convolute paperboard tube has several substantially planar surfaces (e.g., a rectangular mandrel yields four substantially flat sections, such as thick-caliper laminated paperboard sheets).

As further depicted in FIGS. 2A-2D, the edges 20 (e.g., the rounded corners) of the convolute paperboard tube 12 are removed to yield several flat laminated paperboard sheets 10 (e.g., thick-caliper boards). The number of flat sheets 10 produced is a function of the mandrel's number of flat sides configured for winding paper (e.g., the mandrel's polygonal shape). For example, as illustrated in FIGS. 2A-2D, a square mandrel 16 can yield four laminated paperboard sheets 10.

Those having ordinary skill in the art will appreciate that the mandrel 16 can have other polygonal shapes (e.g., triangular, quadrilateral, pentagonal, hexagonal, or octagonal) to form another number of flat laminated paperboard sheets or boards 10 (e.g., five or more thick-caliper laminated paper sheets). Those having ordinary skill in the art will further appreciate that the resulting thick-caliper laminated paperboard sheets should be sufficiently flat to satisfy commercial expectations (e.g., applications requiring substantially planar laminated paper sheets).

The length of the resulting laminated paperboard sheets 10, such as depicted in FIG. 2D, reflects the width of the paper 14 rewound onto the exemplary polygonal mandrel 16, such as depicted in FIG. 1. The width of the resulting laminated paperboard sheets 10 reflects the width of the corresponding planar section of the polygonal mandrel 16, albeit accounting for increases in paperboard thickness and edge rounding as the convolute tube is formed. The thickness of the laminated paperboard sheets 10 is the thickness of the convolute paperboard tube 12. In this regard, the paper 14 is rewound onto the polygonal mandrel 16 in sufficient lengths to achieve the desired thickness of the convolute paperboard tube 12. This exemplary method is capable of achieving laminated paperboard sheets 10 (e.g., boards) of practically any thickness (e.g., thick-caliper laminated paperboard with a thickness of 100 mils to 2000 mils or more). Moreover, two or more multi-ply laminated sheets or boards 10, such as depicted in FIG. 2D, can optionally be laminated together to yield a thicker laminated paperboard sheet or board.

In one exemplary embodiment, the method depicted in FIG. 1 employs a 22-inch by 22-inch square mandrel 16 upon which 60-inch wide paper 14 is wound with adhesive bonding of a continuous paper feed (e.g., as adjacent plies on the mandrel) until the convolute tube 12 achieves a paperboard thickness of about 0.5 inch (i.e., 500 mils). See e.g., FIG. 2A. Thereafter, a one-inch strip of paperboard is removed at each side of the four rounded corners (i.e., eight cuts) to produce four sheets 10, each 60 inches long (i.e., the paper width) and 20 inches wide (e.g., slightly less than the width of the corresponding planar section of the square mandrel 16). See e.g., FIGS. 2B-2D. In this way, four thick-caliper, flat laminated paper sheets are extracted from the convolute paperboard tube.

Figure 3:
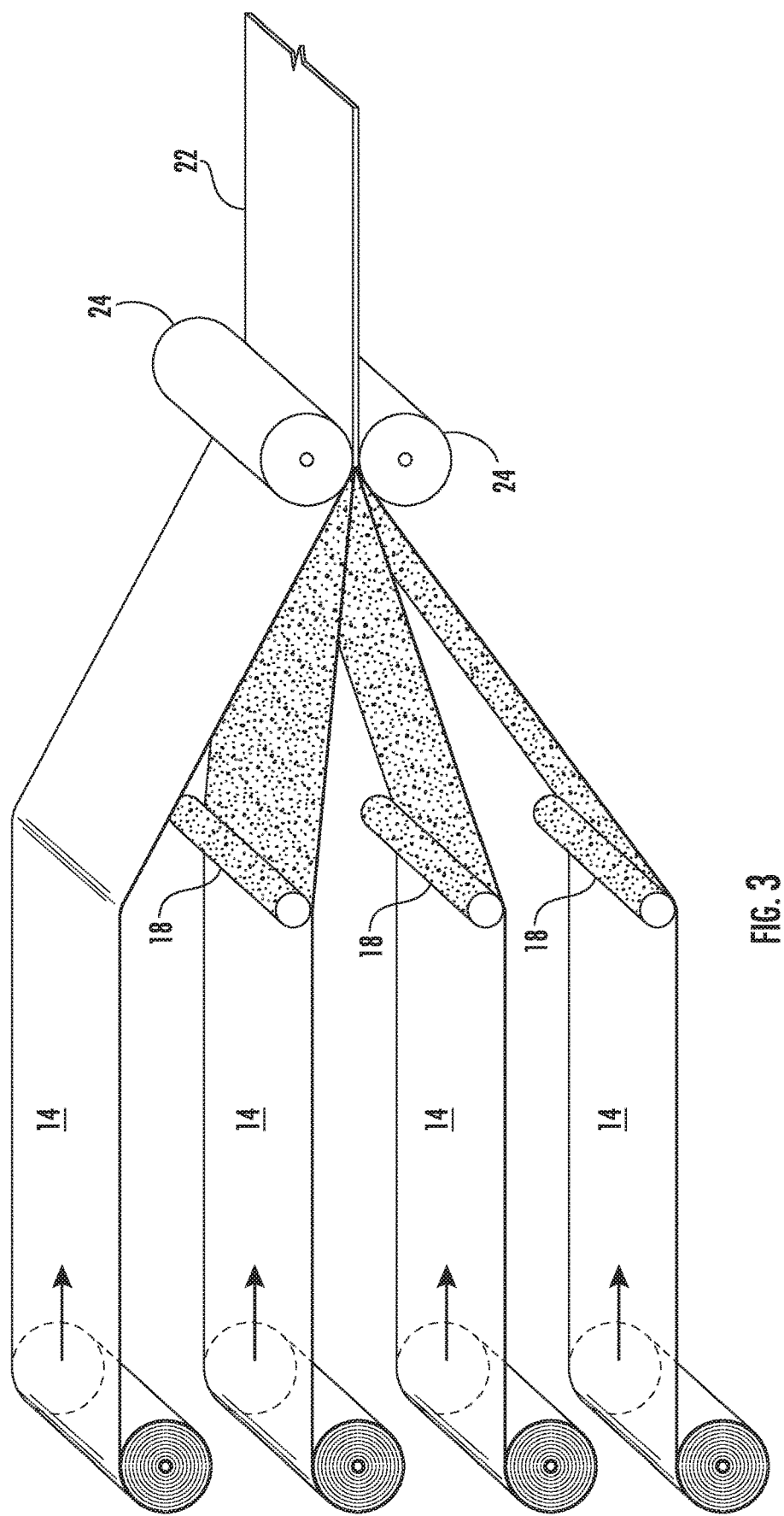
FIGS. 3 and 4 depict a system and method for forming laminated paper or paperboard sheets, in accordance with an embodiment of this disclosure.

In another process embodiment partially depicted in FIG. 3, laminated paper or paperboard sheets 10 (FIG. 4) are manufactured by pulling together and joining together two or more webs of paper 14 (e.g., four or five webs of 50-mil paper), which are unwound from respective paper rolls (e.g., jumbo rolls of paper), to form a laminated web 22 of thicker paper or paperboard. As depicted in FIG. 3, as the paper 14 is unwound from each paper roll, adhesive is applied to at least one surface between adjacent paper webs by way of adhesive applicators 18. FIG. 3 depicts adhesive applied to the top surface of each paper web 14 (except the uppermost paper web) to bond adjacent layers of paper. The adhesive is schematically represented by stippling. The respective paper webs 14 are then pressed together (e.g., nipped between press rollers 24) to facilitate the formation of the laminated paper web 22 (e.g., a four-layer laminated paper web as shown in FIG. 3). The thickness of the resulting laminated paper web 22 reflects the combined thickness of the respective paper webs 14. By way of example, four 50-mil paper webs 14 yield about a 200-mil laminated paper web 22 and five 50-mil paper webs yield about a 250-mil laminated paper web. Those having ordinary skill in the art will appreciate that this process is limited only by the capacity of the paper laminator (e.g., four or five reels of paper) and the caliper maximum of cylinder paperboard (typically 0.050").

Figure 4:
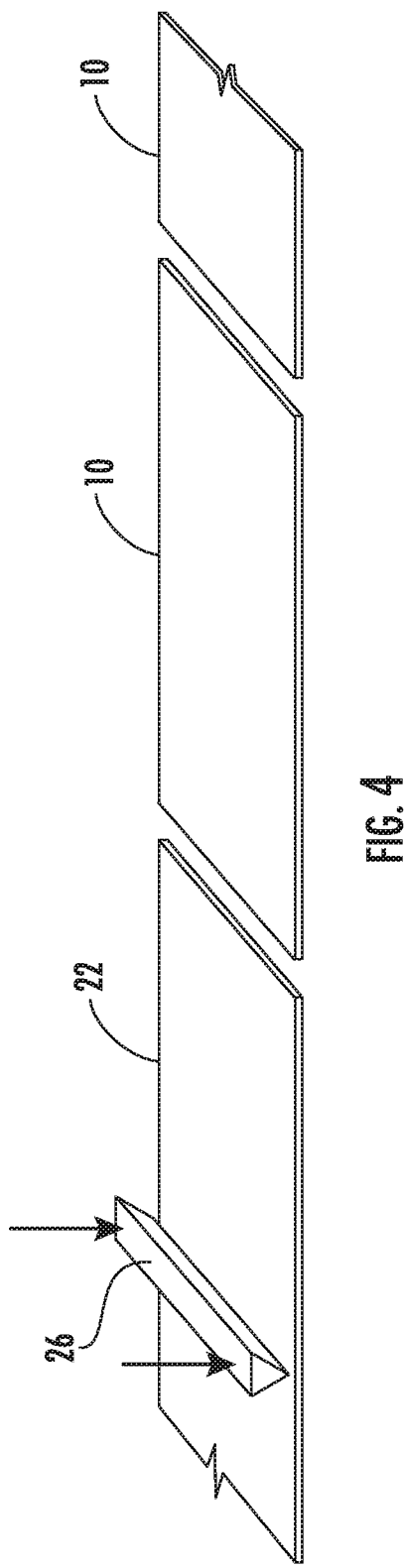
Figure 5:
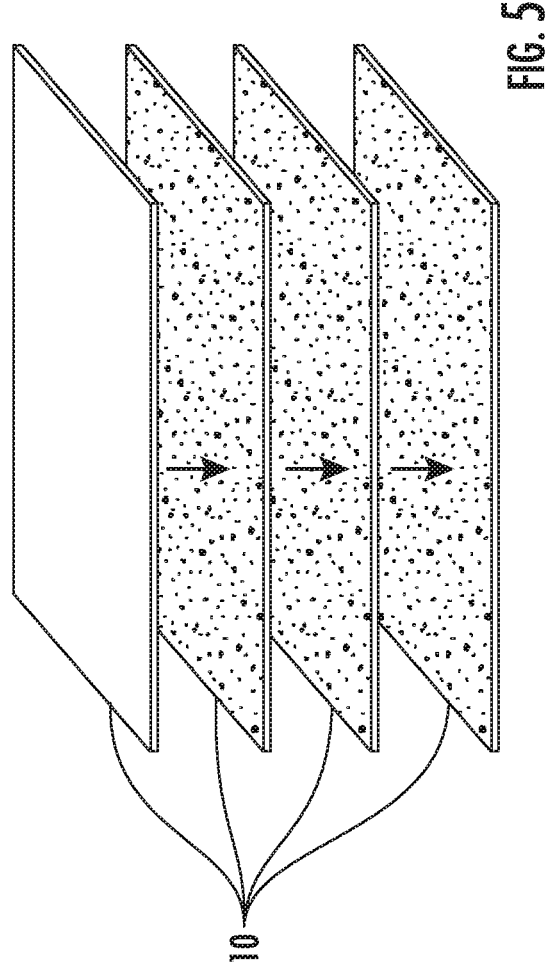
FIG. 5 depicts a system and method for forming laminated paper or paperboard sheets from precursor laminated paper or paperboard sheets, in accordance with another embodiment of this disclosure.

As further depicted in FIG. 4, the laminated paper web 22 (or paperboard web) is then cut to form laminated paper or paperboard sheets 10. The laminated paper web 22 can be cut in any suitable manner, for example using a cutting die 26 with a blade extending crosswise to the laminated paper web 22. As schematically depicted in FIG. 5, the resulting multi-ply laminated sheets 10 can optionally be laminated together to yield a thicker laminated paperboard sheet. For example, two 250-mil laminated paper sheets 10 can be adhesively combined to yield a 500-mil (~0.5-inch) laminated paperboard sheet. By way of further illustration and as depicted in FIG. 5, four 200-mil laminated paper sheets 10 can be adhesively combined to yield an approximately 800-mil (~0.8-inch) laminated paperboard sheet.

Figure 6:
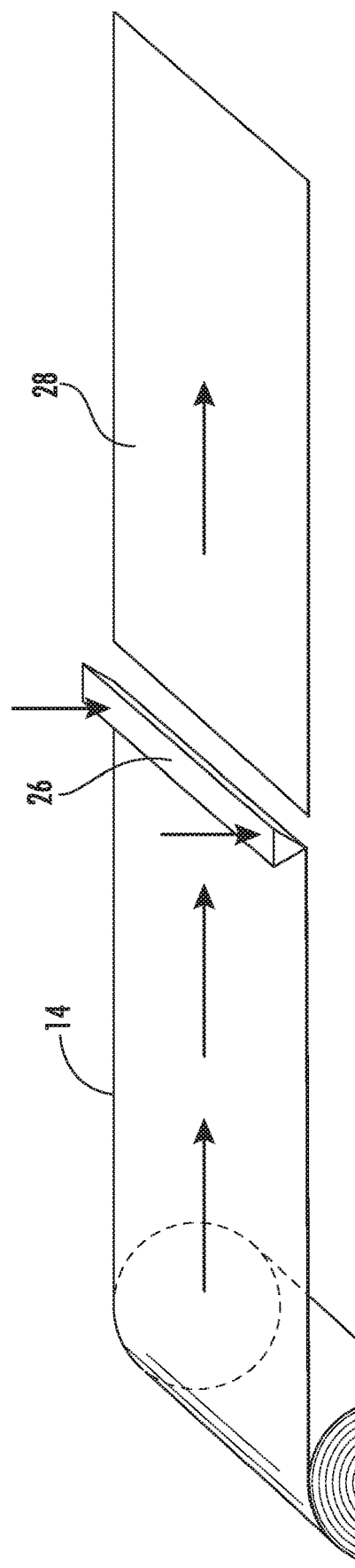
FIGS. 6 and 7 depict a system and method for forming laminated paper or paperboard sheets, in accordance with another embodiment of this disclosure.

In another process embodiment partially depicted in FIG. 6, laminated paper or paperboard sheets 10 (e.g., FIGS. 2C, 2D, and 4) are manufactured from a single web of paper 14 (e.g., one web of 50-mil paper). As depicted in FIG. 6, as the paper 14 is unwound from a paper roll (e.g., a jumbo roll of paper), the paper web is cut (e.g., using a cutting die 26) to the desired length (e.g., 4 feet×8 feet as shown in FIG. 6) to serially form individual paper sheets 28.

Figure 7:
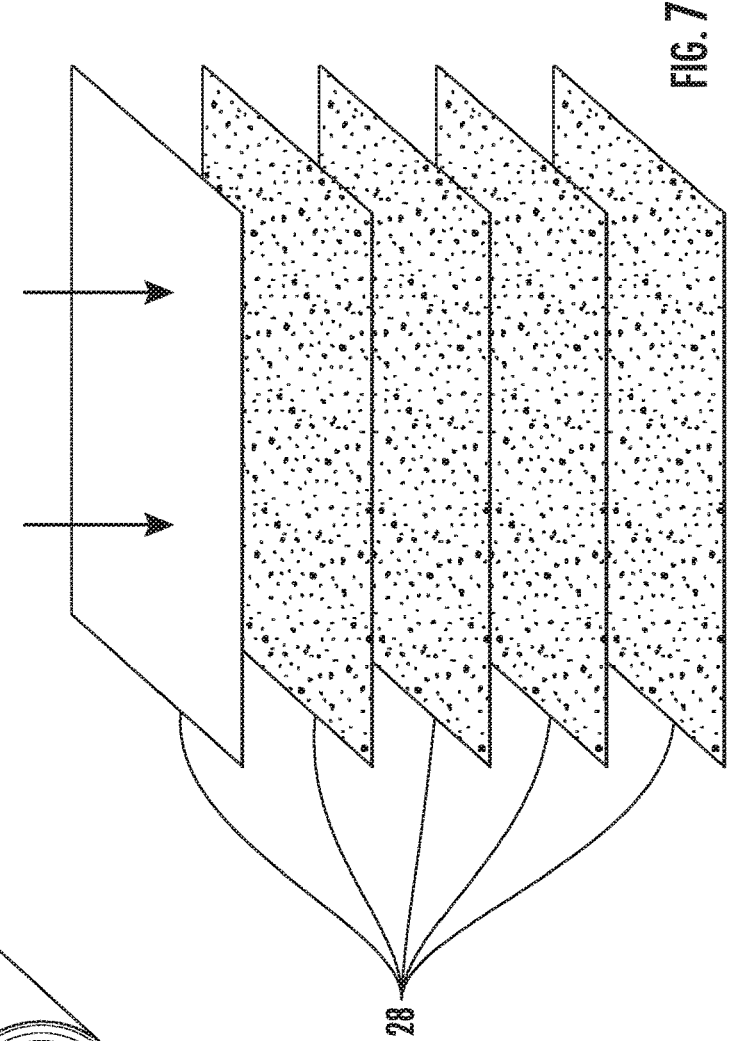

As schematically depicted in FIG. 7, multiple individual sheets 28 of paper (e.g., five paper sheets) are then laminated together to yield a laminated paper or paperboard sheet 10 having the desired thickness. In one example, adhesive (which is schematically depicted by stippling in FIG. 7) is applied to the top surface of each individual paper sheet 28 (except the uppermost paper sheet) to bond adjacent layers of paper. FIG. 7 illustrates five 50-mil individual paper sheets 28 being adhesively combined to yield a 250-mil (~0.25-inch) laminated paperboard sheet. As noted, two or more multi-ply laminated sheets 10 (e.g., FIGS. 2C, 2D, and 4) can optionally be laminated together to yield a thicker laminated paperboard sheet.

Virgin paper and/or recycled paper 14 may be used in any of the foregoing processes for making laminated paper materials 10. An exemplary constituent paper 14 is uncoated recycled paperboard (URB). Other exemplary constituent papers 14 include coated recycled paperboard (CRB), solid bleached sulfate (SBS), coated unbleached Kraft (CUK), uncoated unbleached Kraft (UUK), linerboard, and/or cardboard. Typical paper 14 might have a caliper of between about 10 mils and 50 mils.

In the examples depicted in the drawings, each ply of the laminated sheets 10 is paper (e.g., paperboard). That said, it is within the scope of the present invention to include one of more non-paper layers or plies in the present thick-caliper laminated paperboard materials 10.

Moreover, in any of the foregoing processes for making laminated paper materials 10, exemplary adhesives include emulsion adhesives (including polymer dispersion adhesives and solvent-based adhesives), pressure-sensitive adhesives, contact adhesives, hot-melt adhesives, and thermoplastics. Particular adhesives include polyvinyl alcohol, polyvinyl acetate, starch, and sodium silicate.

The present laminated paper materials, such as laminated paperboard sheets 10, can be formed into products and product components, such as material-handling products (e.g., pallets, and rope, cable, and wire reels) and furniture. As alternatives to wood and wood-like materials, such as plywood, medium-density fiberboard (MDF), and oriented strand board (OSB), the present laminated paperboard materials 10 are typically readily recyclable, thereby minimizing waste.

Exemplary paper sheets 10 might be as thin as 0.025 inch (e.g., 0.0625 inch) but are typically laminated to achieve a thickness of 0.100 inch or more (e.g., 0.25 inch to 1.5 inches). When used as alternatives to wood and wood-like materials, the thickness of the laminated paperboard sheet is roughly sized to match the thickness and/or strength of a conventional wood or wood-like material (e.g., $^{15}/_{32}$", $^{23}/_{32}$", or $^{29}/_{32}$"). In some embodiments, the thick-caliper laminated paper sheets 10 according to the present invention possess adequate strength, superior flexibility, and better performance than plywood, medium-density fiberboard (MDF), and oriented strand board (OSB) of comparable thicknesses.

As noted, this U.S. nonprovisional incorporates entirely by reference both U.S. Patent Application No. 62/624,972 and U.S. Patent Application No. 62/799,322. This U.S. nonprovisional application incorporates by reference a preliminary testing report entitled Paperboard and Wood Characterization—Preliminary Report (3-point bend and compression parallel to grain) (2019), which is provided as Appendix 1 in priority U.S. Patent Application No. 62/799, 322 for Methods of Making Laminated Paperboard (filed Jan. 31, 2019). The preliminary testing was performed by the School of Packaging at Michigan State University (MSU) in accordance with ASTM D143-14 (Standard Test Methods for Small Clear Specimens of Timber), which is hereby incorporated by reference in its entirety. The preliminary testing report specifically references ASTM D143 section 8 (Static Bending) and ASTM D143 section 9 (Compression Parallel to Grain), each section being incorporated by reference in its entirety (above).

This U.S. nonprovisional application incorporates by reference preliminary observations regarding the MSU preliminary testing report in a document entitled Observations regarding MSU Preliminary Testing Report, which is provided as Appendix 2 in priority U.S. Patent Application No. 62/799,322 for Methods of Making Laminated Paperboard (filed Jan. 31, 2019).

In exemplary embodiments depicted in FIGS. 8A-8D, articles formed from (e.g., cut from) the present laminated paper materials 10 (e.g., FIGS. 2C, 2D, and 4) are structural components of reels 100. More specifically, flanges 102 of the reels 100 are formed from (e.g., cut from, comprise, consist essentially of, and/or consist of) the present laminated paper materials 10. The present thick-caliper laminated paperboard materials exhibit excellent flexibility, which helps reduce breakage of the reel flanges (as often occurs with plywood, MDF, and OSB flanges).

Figure 8A:
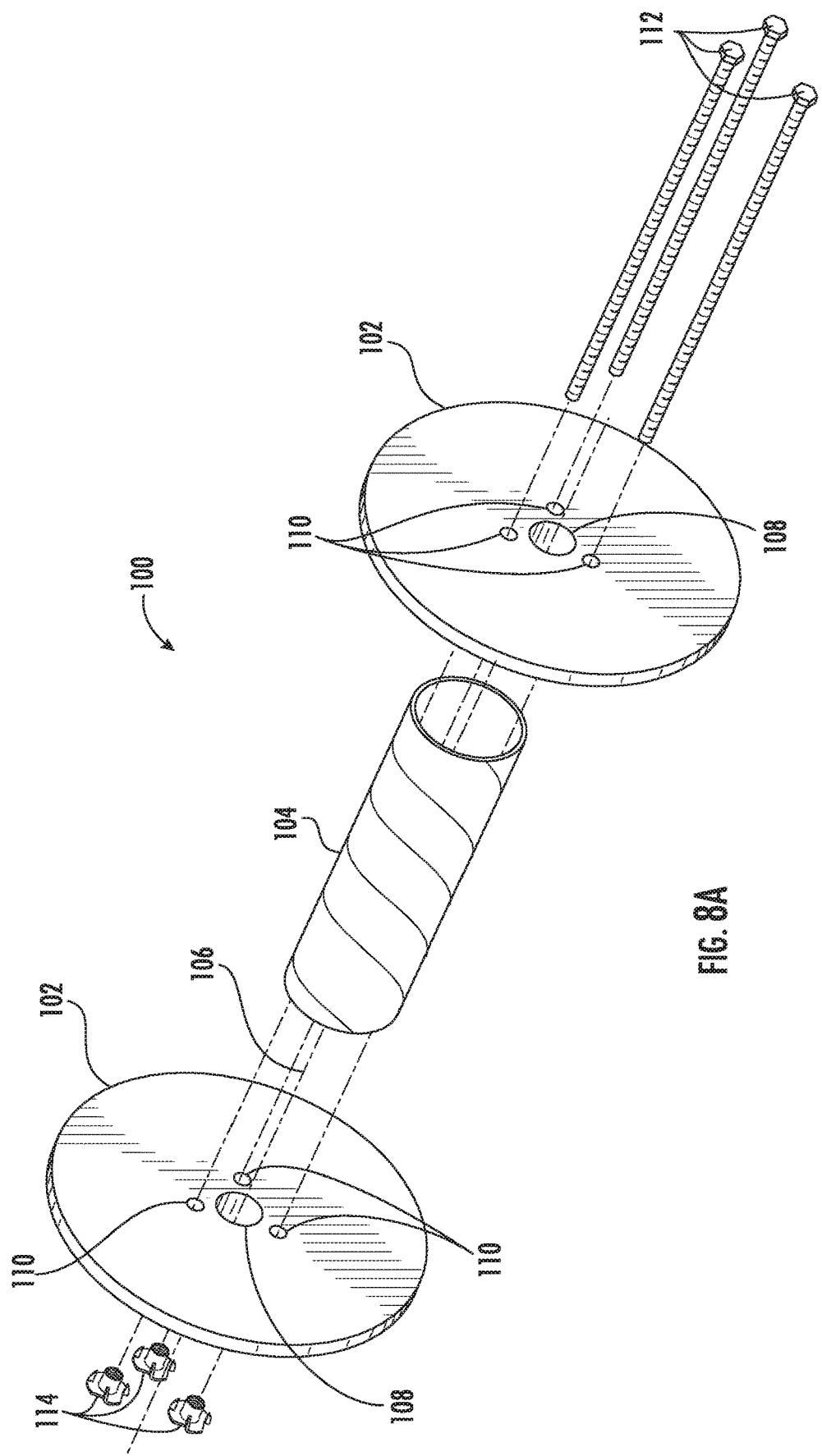
FIG. 8A is an exploded view of a reel at least partially formed from laminated paper or paperboard sheet, in accordance with an embodiment of this disclosure.

FIG. 8A is an exploded view depicting that the reel 100 includes a laminated paperboard core 104 having opposite first and second end sections and defining a lengthwise axis 106 extending between the first and second end sections. The core 104 can be a conventional laminated paper tube (e.g., a spirally wound or convolute paperboard tube) that is typically cylindrical, although differently configured tubes and cores are within the scope of this disclosure. A first flange 102 is mounted to the core's first end section, or more specifically the core's first end, and extends crosswise to the lengthwise axis 106. Similarly, a second flange 102 is mounted to the core's second end section, or more specifically the core's second end, and extends crosswise to the lengthwise axis 106. The flanges 102 and core 104 are cooperatively configured so that an annular gap extends around the core between the flanges. Each of the first and second flanges includes an outer periphery positioned radially outwardly from the core 104.

Reiterating from above for an embodiment of this disclosure, each of the first and second flanges 102 is formed from (e.g., cut from, comprise, consist essentially of, and/or consist of) the present laminated paper materials 10 (e.g., FIGS. 2C, 2D, and 4). In the example depicted in FIG. 8A, each flange 102 includes a central and outer holes 108, 110 that extend through the flange.

The first and second flanges 102 can be mounted to the core 104 in any suitable manner. In the example depicted in FIG. 8A, the first and second flanges 102 are mounted to the core 104 through the use of at least fasteners. The fasteners can be in the form of bolts 112 and nuts 114 (e.g., T-nuts). When assembled, the shafts of the bolts 112 extend through respective outer holes 110 in the first flange 102, through a central passageway that extends through the core 104, and typically at least partially into respective outer holes 110 in the second flange 102. Somewhat similarly, internally-threaded shafts of the nuts 114 extend at least into respective outer holes 110 in the second flange 102. The threaded distal ends of the bolts 112 are respectively threaded tightly into the internally-threaded shafts of the nuts 114 so that inner surfaces of the heads of the bolts firmly engage the outer surface of the first flange 102, and inner surfaces of the heads of the nuts firmly engage the outer surface of the second flange 102. Typically, the threaded engagement between the bolts 112 and nuts 114 is tight enough so that the flanges 102 are fixedly connected to the core 104 (e.g., in a manner that seeks to prevent any relative rotation between the flanges and the core).

Figure 8B:
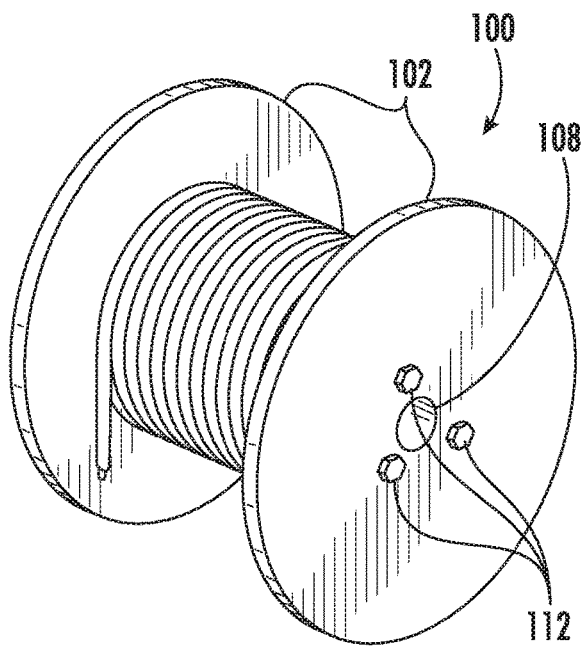
FIGS. 8B through 8D depict the reel of FIG. 8A with different articles wound thereupon.
Figure 8C:
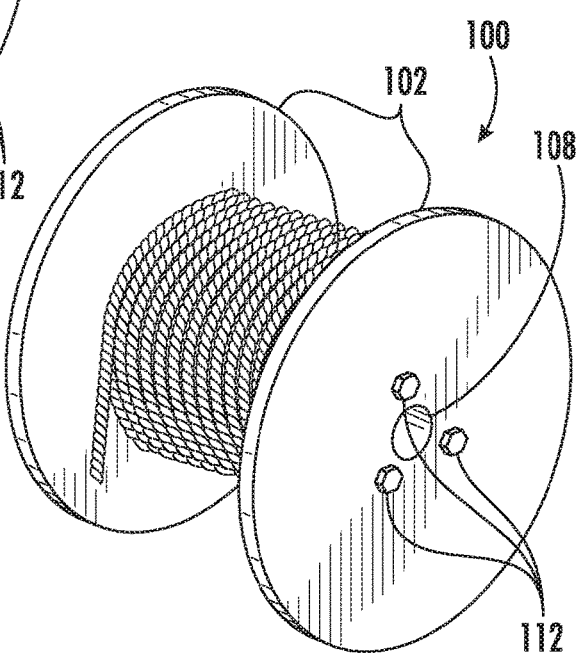
Figure 8D:
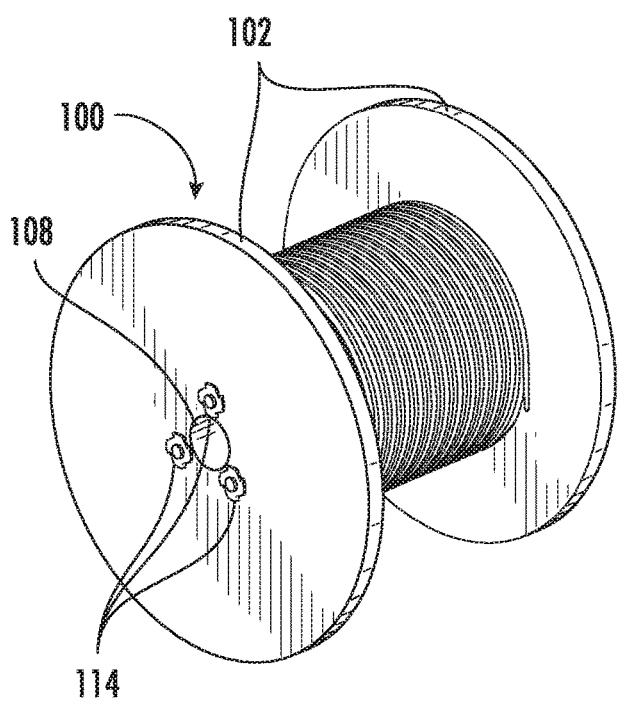

In exemplary embodiments depicted in FIGS. 8B-8D, the reels 100 are configured to be used as cable reels, wire reels, rope reels, and/or chain reels (e.g., reels for displaying and dispensing reeled products in a hardware supply store). As noted, conventional rope reels, cable reels, and wire reels are typically discarded when worn, damaged, or otherwise deemed unusable. The present recyclable laminated paper materials can be readily configured and sized for various reels 100, such as cable reels as depicted in FIG. 8B, rope reels as depicted in FIG. 8C, and wire reels as depicted in FIG. 8D.

A typical reel 100 includes paperboard structural components (e.g., a core 104 and flanges 102) having a thickness of between 0.125 inch and 0.50 inch (e.g., 125 mils to 500 mils, such as 375 mils) to provide sufficient strength and durability. An exemplary reel 100 whose structural components (except fasteners, etc.) are made entirely from paper (e.g., paperboard) includes a central paperboard tube 104 (e.g., a paperboard tube having an inner diameter of 6 inches and an inner diameter of 5.5 inches) to which paperboard ends or flanges 102 (e.g., circular sides) are affixed substantially perpendicular to the paperboard tube's central axis 106. Another exemplary reel 100 with a similar configuration includes a larger central paperboard tube 104 (e.g., a paperboard tube having an inner diameter of 14 inches and an inner diameter of 13.25 inches). These paper reels 100 are completely and fully recyclable in two recycle streams (e.g., paperboard structural components and fastening hardware).

Figure 9:
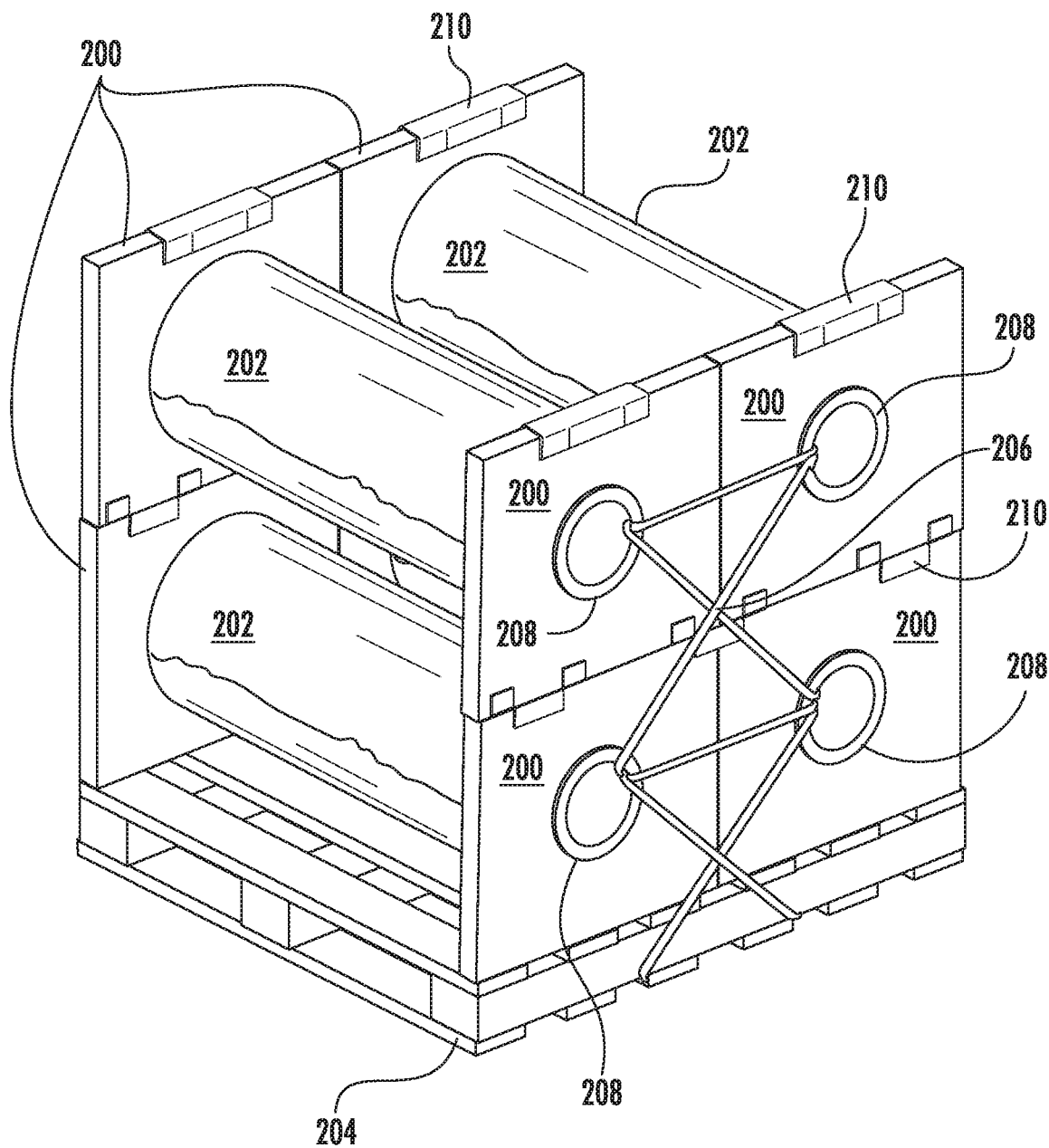
FIG. 9 depicts roll-suspension products on a pallet, wherein at least some of the items depicted in FIG. 9 are at least partially formed from laminated paper or paperboard sheet, in accordance with an embodiment of this disclosure.

In yet another exemplary embodiment depicted in FIG. 9, the present laminated paper materials 10 (e.g., FIGS. 2C, 2D, and 4) are the structural side panel components 200 for roll-suspension products, which are used to suspend rolls 202 of materials such as plastic film, foil, and paper. The wooden sides of conventional roll-suspension products (and the underlying wooden pallets) are typically discarded when worn, damaged, or otherwise deemed unusable. As depicted in FIG. 9, sheets of the present recyclable laminated paper materials 10 can be readily configured and sized to function as the side structures 200 in roll-suspension products. The laminated paper materials 10 (e.g., thick-caliper laminated paper boards) can also form the base pallet 204 supporting the product rolls 202. Where the cores of the product rolls 202 are formed of paper (e.g., paperboard tubes), essentially the entire roll-suspension product is recyclable (except perhaps the plastic strapping 206 threaded through the respective rolls 202, plastic mounting sleeves 208, channel clips 210, and/or an underlying wooden pallet 204, if the present laminated paper materials are not used instead).

Figure 10A:
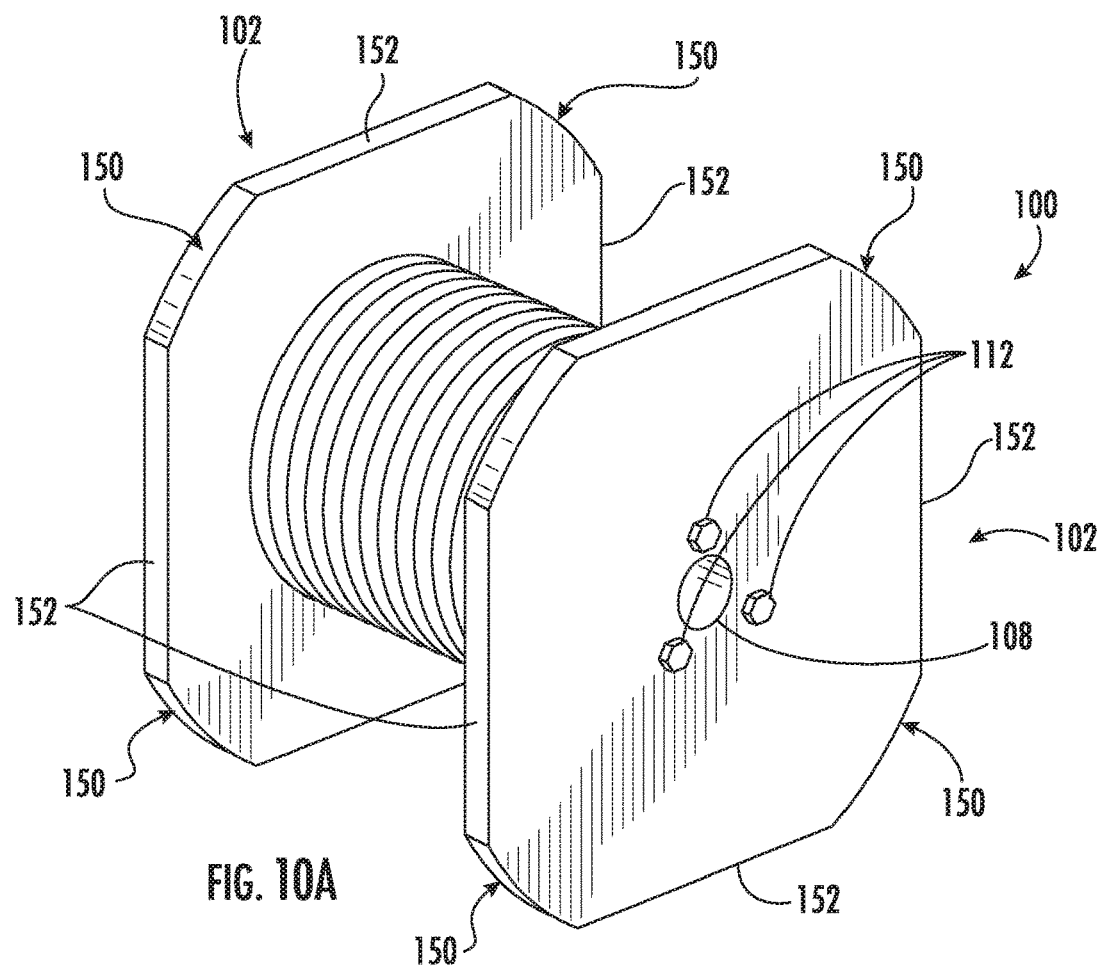
FIGS. 10A and 10B depict a reel at least partially formed from laminated paper or paperboard sheet, in accordance with an embodiment of this disclosure.
Figure 10B:
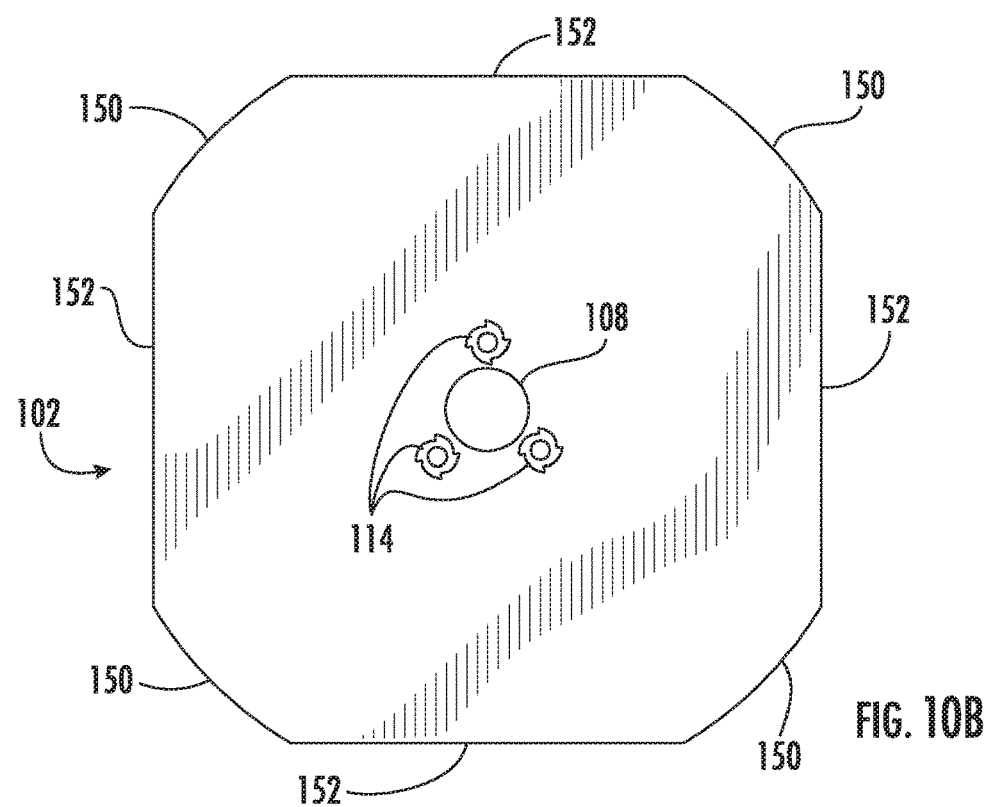

In yet another exemplary embodiment depicted in FIGS. 10A-10B, the reels 100 can be the same as those discussed above with reference to FIGS. 8A-8D, except, for example, that the flanges 102 can be rectangular (e.g., square), and optionally the corners 150 of the square flanges can be truncated (e.g., beveled) so the flanges have beveled corners (e.g., the flanges can be octagonal or other suitable configurations). In the example depicted in FIGS. 10A-10B, each flange 102 has an outer periphery positioned radially outwardly from the core 104, and the outer periphery includes substantially straight edges 152 respectively extending from opposite sides of the corners 150. In the example depicted in FIGS. 10A-10B, respective edges 152 of the flanges 102 are cooperatively configured for facilitating stacking (e.g., substantially straight stacking edges 152). For example, first through fourth edges 152 of the first flange 102 can respectively be substantially coplanar with first through fourth edges 152 of the second flange. In this way, the reel 100 can be oriented so horizontal edges 152 of the first flange can be respectively coplanar horizontal edges 152 of the second flange, and/or upright (e.g., vertical) edges 152 of the first flange can be respectively coplanar upright edges 152 of the second flange. This facilitates edge-to-edge stacking of the reels 100.

Figure 11:
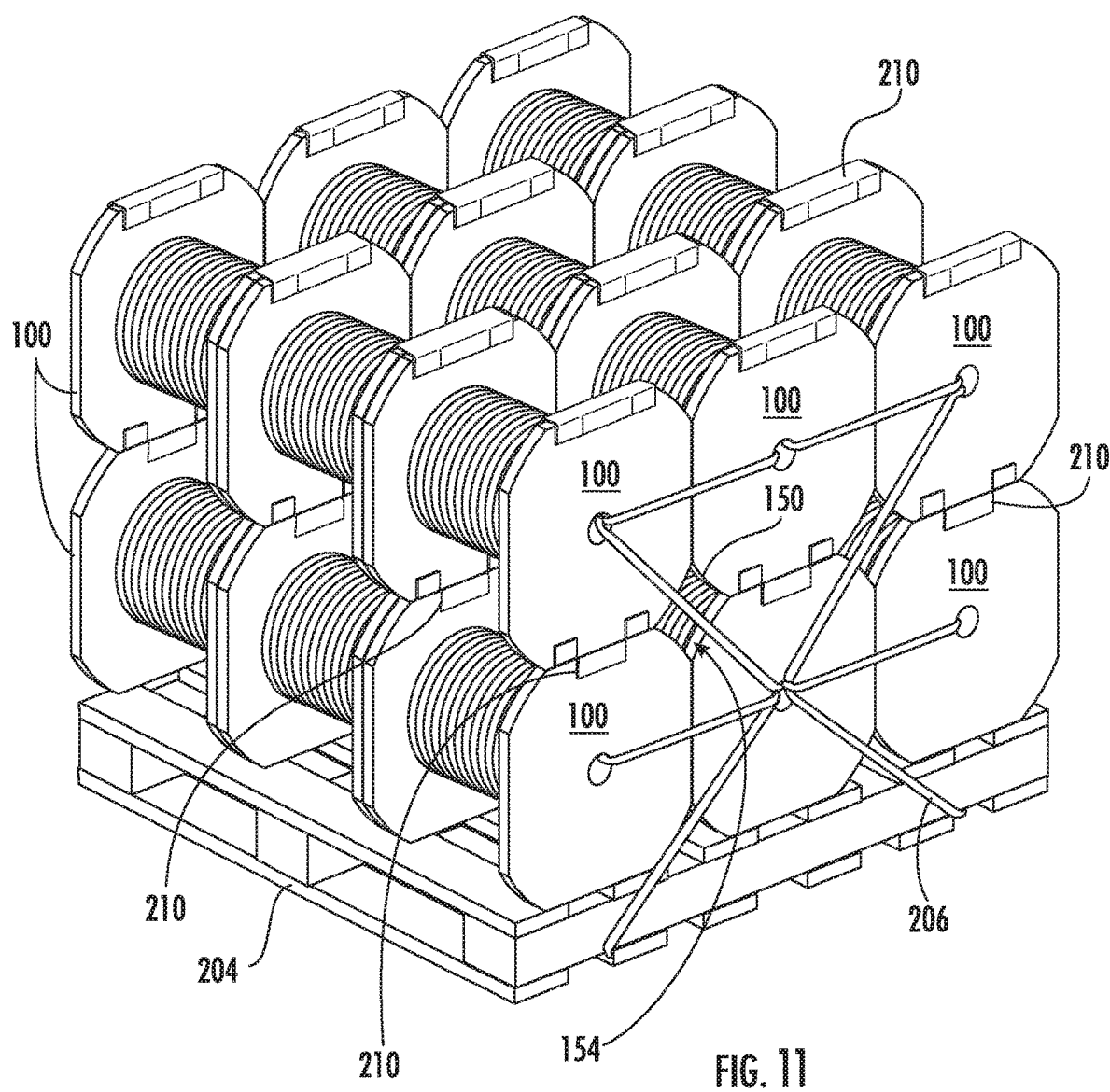
FIG. 11 depicts an array of the reels of FIGS. 10A and 10B on a pallet, in accordance with an embodiment of this disclosure.

In yet another exemplary embodiment depicted in FIG. 11, several of the beveled product reels 100 of FIGS. 10A-10B are assembled into a three-dimensional array (e.g., a roll-suspension product) on a pallet 204. In the array of reels 100 depicted in FIG. 11, a first reel is beneath, and supporting, a second reel, comprising a stacking edge 152 of the first flange 102 of the first reel extending horizontally and supporting a horizontally extending, lower stacking edge of the first flange of the second reel, and a stacking edge of the second flange of the first reel extending horizontally and supporting a horizontally extending, lower stacking edge of the second flange of the second reel. Similarly, in the array of reels 100 depicted in FIG. 11, a third reel is beneath, and supporting, a fourth reel, comprising a horizontally extending, upper stacking edge of the first flange of the third reel supporting a horizontally extending, lower stacking edge of the first flange of the fourth reel, and a horizontally extending, upper stacking edge of the second flange of the third reel supporting a horizontally extending, lower stacking edge of the second flange of the fourth reel. The first reel is adjacent the third reel, comprising an upright side stacking edge of the first flange of the first reel being adjacent an upright side stacking edge of the first flange of the third reel, and an upright side stacking edge of the second flange of the first reel being adjacent an upright side stacking edge of the second flange of the third reel. The second reel is adjacent the fourth reel, comprising an upright side stacking edge of the first flange of the second reel being adjacent an upright side stacking edge of the first flange of the fourth reel, and an upright side stacking edge of the second flange of the second reel being adjacent an upright side stacking edge of the second flange of the fourth reel. In the array of reels 100 depicted in FIG. 11, the cores of the first, second, third, and fourth reels collectively extend partially around a central area 154, and one or more beveled corners 150 provide a line of sight into the central area.

In yet other exemplary embodiment depicted in FIGS. 12A-12C, the present laminated paper materials 10 (e.g., FIGS. 2C, 2D, and 4) are formed into core closures (e.g. end stops) or core plugs 300 that can be configured, for example, to close and protect the ends of paper tubes 302, to secure contents contained inside a paper tube, to protect paper or paperboard rolls from handling damage (e.g., from clamp trucks), or to close one or more ends of a driveshaft damper or other suitable tube (e.g., a driveshaft damper including a cylindrical paperboard structure), such as disclosed in commonly assigned U.S. Pat. Nos. 8,801,526 and 9,599,147, each of which is hereby incorporated by reference in its entirety. In the latter application, employing core closures or core plugs facilitates the use of driveshaft dampers as propshaft plugs during end-yoke welding to prevent unwanted slag contamination within the propshaft.

In FIG. 12B, the cylindrical plug 300 (e.g. an end stop) is secured inside the end of the paper tube 302 with fasteners, such as staples 302-12D. In FIG. 12C, the plug 300 is tapered for forming an interference fit when forced into the end of the paper tube 302 (e.g., a cylindrical paperboard structure). The plug 300 of FIG. 12C can have a hole 306 extending therethrough configured for receiving the tip of a hook or the like, so that optionally the core plug can be pulled out of the paper tube.

In addition, the core plugs and core closures may be treated with a moisture-barrier (e.g., a wax coating) to inhibit moisture transfer between the environment and the paper tubes (e.g., a paperboard core carrying jumbo paper rolls or a paperboard driveshaft damper). Such moisture treatment (or analogous barrier treatment) could occur during the manufacture of the paper web, during the formation of the thick-caliper laminated paperboard, or during the manufacture of the core plugs and core closures.

Figure 13A:
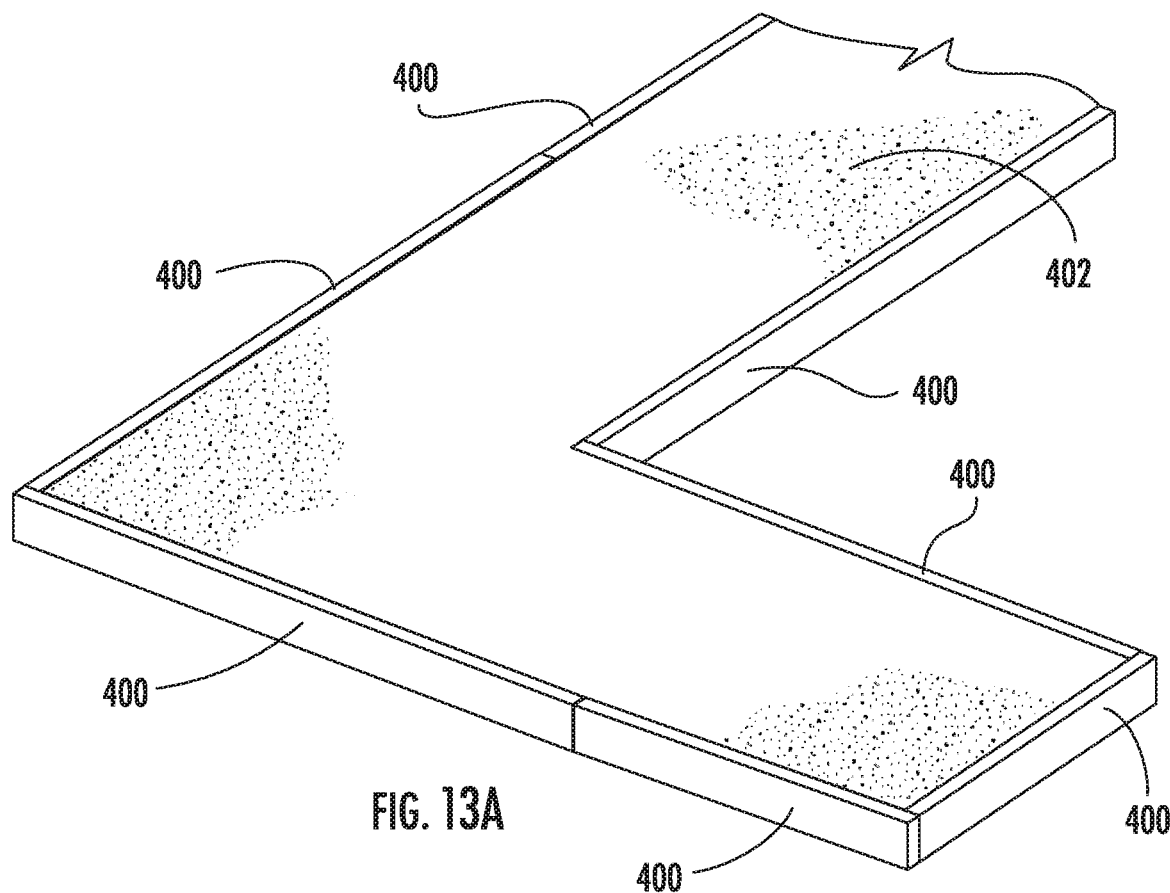
FIGS. 13A and 13B depict forms positioned adjacent to edges of concrete, wherein the forms are at least partially formed from laminated paper or paperboard sheet or board, in accordance with an embodiment of this disclosure.
Figure 13B:
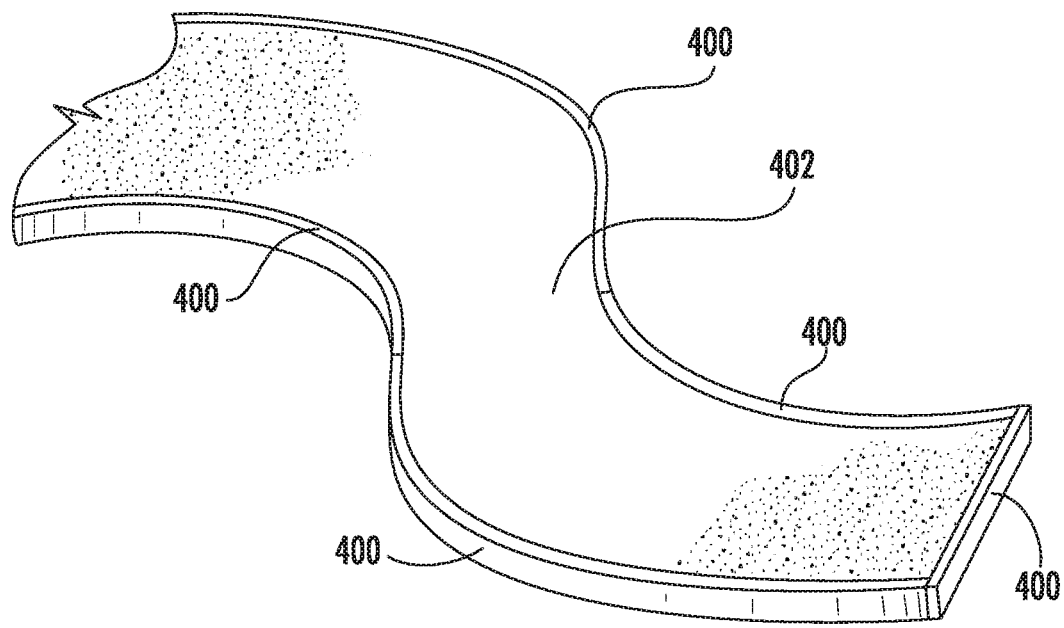

In yet other exemplary embodiments depicted in FIGS. 13A and 13B, the present laminated paper materials 10 (e.g., FIGS. 2C, 2D, and 4) are used as compression relief material or forms 400 for flatwork concrete 402 construction. For conventional concrete applications, 2"×4" pine board might be used for straight runs, whereas 0.25-inch MDF bender board might be used for curved runs. The present recyclable laminated paper materials 10 can be readily configured and sized for various applications (e.g., for use as forms 400) during concrete 402 construction. For example, the present thick-caliper laminated paperboard materials exhibit excellent flexibility, which facilitates the formation of curved concrete applications (e.g., serpentine concrete walkways such as depicted in FIG. 13B).

Figure 14:
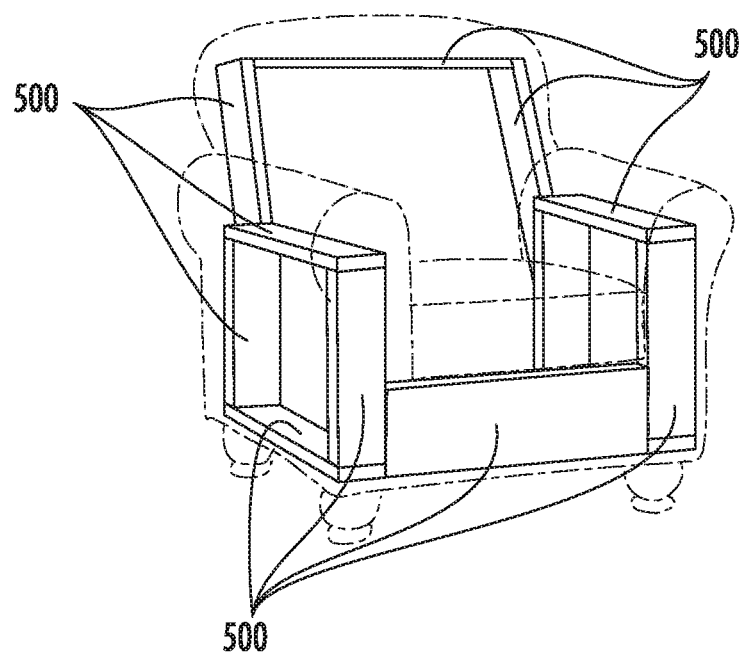
FIG. 14 depicts a piece of furniture having a frame formed at least partially from structural components, wherein the structural components are at least partially formed from laminated paper or paperboard sheet or board, in accordance with an embodiment of this disclosure.

In yet another exemplary embodiment depicted in FIG. 14, the present laminated paper materials 10 (e.g., FIGS. 2C, 2D, and 4) are used as structural components 500 in furniture (e.g., a chair as shown in FIG. 14). The present thick-caliper laminated paperboard materials exhibit excellent flexibility, which facilitates alternative, creative designs (e.g., curved furniture lines).

Other Aspects and Embodiments

The foregoing detailed description and accompanying figures set forth typical embodiments of laminated paper and paperboard alternatives to wood and wood-like materials, and exemplary methods of making such laminated paper and paperboard. The present disclosure is not limited to such exemplary embodiments. It will be apparent that numerous other embodiments of laminated paper and paperboard, and methods for making and using laminated paper and paperboard, may be provided in accordance with the present disclosure. The present disclosure may utilize any variety of aspects, features, or steps, or combinations thereof. The figures may be schematic representations that are not necessarily drawn to scale.

It is within the scope of this disclosure for one or more of the terms "substantially," "about," "approximately," and/or the like, to qualify each adjective and adverb of the foregoing disclosure, to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "substantially," "about," "approximately," and the like.

The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

While various aspects, features, and embodiments have been disclosed herein, other aspects, features, and embodiments will be apparent to those having ordinary skill in the art. The various disclosed aspects, features, and embodiments are for purposes of illustration and are not intended to be limiting. It is intended that the scope of the present invention includes at least the following claims and their equivalents:

The invention claimed is:

1. A method of making a laminated paper sheet, comprising:
   winding paper around a mandrel having a plurality of flat sides to form a convolute tube having a plurality of paper layers and a plurality of substantially flat sides, wherein lengthwise edges of the convolute tube are respectively defined between adjacent substantially flat sides of the convolute tube's plurality of substantially flat sides;
   applying adhesive to the paper to bond the convolute tube's adjacent layers of paper; and
   removing from the convolute tube one or more substantially flat laminated paper sheets.

2. The method according to claim 1, wherein:
   the step of winding paper around a mandrel comprises winding paper having a caliper of at least 10 mils to form a convolute tube having a thickness of at least 125 mils; and
   the step of removing from the convolute tube one or more substantially flat laminated paper sheets comprises removing the lengthwise edges of the convolute tube to yield a plurality of substantially flat laminated paper sheets.

3. The method according to claim 1, wherein:
   the step of winding paper around a mandrel comprises winding paper around a substantially rectangular mandrel; and
   the step of removing from the convolute tube one or more substantially flat laminated paper sheets comprises removing the lengthwise edges of a substantially rectangular convolute tube to yield four substantially flat laminated paper sheets.

4. The method according to claim 1, wherein:
the step of winding paper around a mandrel comprises winding paper around a polygonal mandrel having five or more substantially flat sides; and
the step of removing from the convolute tube one or more substantially flat laminated paper sheets comprises removing the lengthwise edges of a convolute tube having five or more substantially flat sides to yield at least five substantially flat laminated paper sheets.

5. The method according to claim 1, comprising laminating two or more of the substantially flat laminated paper sheets to form a thicker laminated paper sheet or board.

6. The method according to claim 5, wherein the step of laminating two or more of the substantially flat laminated paper sheets yields a laminated paper sheet or board having a thickness of at least 15/32 inch.

7. The method according to claim 1, wherein the step of winding paper around a mandrel comprises winding a continuous paper web to form the convolute tube.

8. The method according to claim 1, wherein the step of applying adhesive to the paper comprises applying adhesive to at least one side of a paper web as the paper web is unwound from a paper roll.

9. The method according to claim 1, wherein the step of removing from the convolute tube one or more substantially flat laminated paper sheets comprises cutting one or more laminated paper sheets from the convolute tube's substantially flat sides, each laminated paper sheet comprising a plurality of paper layers.

10. The method according to claim 1, wherein the step of removing from the convolute tube one or more substantially flat laminated paper sheets comprises removing the lengthwise edges of the convolute tube to yield one or more laminated paper sheets.

11. The method according to claim 1, wherein the step of winding paper around a mandrel comprises winding paper to form a convolute tube having a wall thickness of 100 mils to 2000 mils.

12. The method according to claim 1, wherein:
the step of winding paper around a mandrel yields a convolute tube having a wall thickness of at least 500 mils; and
the step of removing from the convolute tube one or more substantially flat laminated paper sheets yields one or more laminated paper sheets each having a thickness of at least 500 mils.

13. A method of making a laminated paper sheet, comprising:
applying adhesive to at least one side of a paper web as the paper web is unwound from a paper reel;
rewinding the paper web on a mandrel having a plurality of flat sides to form a convolute tube having (i) a plurality of paper plies, (ii) a plurality of flat sides, and (iii) a plurality of lengthwise rounded corners respectively between each pair of adjacent flat sides; and
cutting from the convolute tube one or more laminated paper sheets.

14. The method according to claim 13, wherein the steps of (i) applying adhesive to at least one side of a paper web and (ii) rewinding the paper web on a mandrel adhesively bonds adjacent plies of the paper web.

15. The method according to claim 13, comprising laminating two or more of the laminated paper sheets to form a thicker laminated paperboard sheet or board.

16. The method according to claim 13, wherein the step of cutting from the convolute tube one or more laminated paper sheets comprises removing the convolute tube's lengthwise rounded corners to yield a plurality of laminated paper sheets.

17. The method according to claim 13, wherein:
the step of rewinding the paper web on a mandrel comprises rewinding the paper web around a rectangular mandrel; and
the step of cutting from the convolute tube one or more laminated paper sheets comprises removing the convolute tube's lengthwise rounded corners to yield four laminated paper sheets.

18. The method according to claim 13, wherein:
the step of rewinding the paper web on a mandrel comprises rewinding the paper web around a mandrel having five or more flat sides; and
the step of cutting from the convolute tube one or more laminated paper sheets comprises removing the convolute tube's lengthwise rounded corners to yield at least five laminated paper sheets.

19. The method according to claim 13, wherein the step of rewinding the paper web on a mandrel comprises rewinding a paper web having a caliper of 10 mils to 50 mils to form a convolute tube having a wall thickness of 100 mils to 2000 mils.

20. The method according to claim 13, wherein:
the step of rewinding the paper web on a mandrel comprises rewinding paper to form a convolute tube having a thickness of at least 250 mils; and
the step of cutting from the convolute tube one or more laminated paper sheets yields one or more laminated paper sheets each having a thickness of at least 250 mils.

* * * * *